United States Patent [19]
Masaki

[11] 3,869,030
[45] Mar. 4, 1975

[54] SEWING MACHINE CLUTCH

[75] Inventor: Noriyasu Masaki, Osaka, Japan

[73] Assignee: The Soryu Sewing Machine Mfg. Co., Ltd., Osaka, Japan

[22] Filed: Jan. 17, 1974

[21] Appl. No.: 434,056

[52] U.S. Cl............. 192/67 R, 192/95, 192/114 R, 192/109 A, 74/527, 403/318, 403/320
[51] Int. Cl............................................ F16d 11/04
[58] Field of Search............................ 192/67 R, 95

[56] References Cited
UNITED STATES PATENTS

| | | | |
|---|---|---|---|
| 232,926 | 10/1880 | Berkholz | 192/67 R |
| 1,407,115 | 2/1922 | Bailey | 192/67 R |
| 3,251,630 | 5/1966 | Astley | 192/67 R X |

*Primary Examiner*—Benjamin W. Wyche
*Attorney, Agent, or Firm*—Prangley, Dithmar, Vogel, Sandler & Stotland

[57] ABSTRACT

A push-pull clutch for use in a sewing machine for selectively effecting rotation of a rotary drive shaft in the sewing machine, the clutch including a base member in driving relationship with one end of the drive shaft and rotatable therewith. A drive member is mounted on the drive shaft and is rotatable relative thereto. An operating member is carried by the base member for rotation therewith, the operating member being movable between first and second operating positions in an axial direction relative to the drive shaft and the base member. A drive pin and a transmission pin are provided, the transmission pin effecting rotation between the base member and the drive shaft, and the drive pin engaging the drive member for effecting rotation of the operating member and the base member and the drive shaft, depending on the axial position of the operating member.

10 Claims, 7 Drawing Figures

SEWING MACHINE CLUTCH

The present invention relates to a push-pull type clutch for use in a sewing machine. In general, a clutch in the sewing machine is used to permit disconnection of the power drive mechanism from the drive shaft, so that the drive mechanism also may be used to wind the bobbin.

The household type sewing machines sold heretofore generally have included friction type clutches which require rotational loosening or tightening of a clamp nut to provide the friction engatement with the drive shaft. Such devices, although generally satisfactory, can cause difficulty in operation. The tightening of the clutch may be performed by one person having a stronger wrist than another, whereby the loosening thereof becomes difficult. In addition, the friction surfaces may tend to wear out and consequently make tightening of the clutch more difficult over a period of time as well as resulting in slippage of the drive shaft.

Accordingly, it is a primary object of the invention to provide a push-pull type clutch which allows for the simple and effortless one-hand engagement between the drive member and drive shaft of the sewing machine, without any friction arrangement.

It is a further general object of the invention to provide a push-pull type clutch which may be easily manipulated to insure positive engagement and disengagement of the drive mechanism with the drive shaft, without any slippage between those members, and which does not depend upon the strength of the operator who manipulates the clutch.

It is another object of the invention to provide a push-pull type clutch which may be used on any of a number of individual sewing machines thereby eliminating the need for selecting a particular form of friction type clutch that will work best with a particular machine.

It is a further object of the invention to provide a push-pull clutch for use in a sewing machine for selectively effecting rotation of a rotary drive shaft in the sewing machine, the clutch comprising a base member in driving relationship with one end of the drive shaft and rotatable therewith. A drive member is coaxially mounted on the drive shaft and is freely rotatable relative thereto, the drive member having a boss portion carrying a plurality of circumferentially spaced and axially extending pockets therein. A spline type washer is disposed between the base member and the boss and has at least one inwardly extending key engageable in a cooperating notch provided in the end of the drive shaft, whereby the washer is rotatable with the drive shaft. The washer has a plurality of outwardly extending circumferentially spaced splines. An operating member is carried by the base member and is movable between the first and second operating positions in an axial direction relative to the boss and the base member. A transmission pin extends through aligned apertures provided in the base member and the operating member and between a pair of splines on the washer, whereby rotation of the operating member effects rotation of the base member and the washer and the drive shaft. A drive pin is carried by the operating member and is axially movable therewith relative to the base member and the boss. The drive pin is spaced from the boss when the operating member is pulled to the first operating position, whereby the drive member is rotatable relative to the drive shaft. The drive pin is engaged within one of the pockets in the boss when the operating member is pushed into the second operating position, whereby rotation of the drive member effects rotation of the drive shaft.

It is a further object of the invention to provide, in a push-pull clutch of the character set forth, means for positively holding the operating member in the first or second operating positions so as to preclude accidental engagement or disengagement of the drive member with the drive shaft.

It is a further object of the invention to provide, in a push-pull clutch of the character set forth, bias means for holding the drive pin in position on the operating member, the bias means insuring engagement of the drive pin within one of the pockets on the boss of the drive member when the operating member is pushed to its engaging position.

Further features of the invention pertain to the particular arrangement of the parts of the clutch whereby the above-outlined and additional operating features thereof are attained.

The invention, both as to its organization and method of operation, together with further objects and advantages thereof, will best be understood by reference to the following specification, taken in connection with the accompanying drawings, in which.

Figure 1:
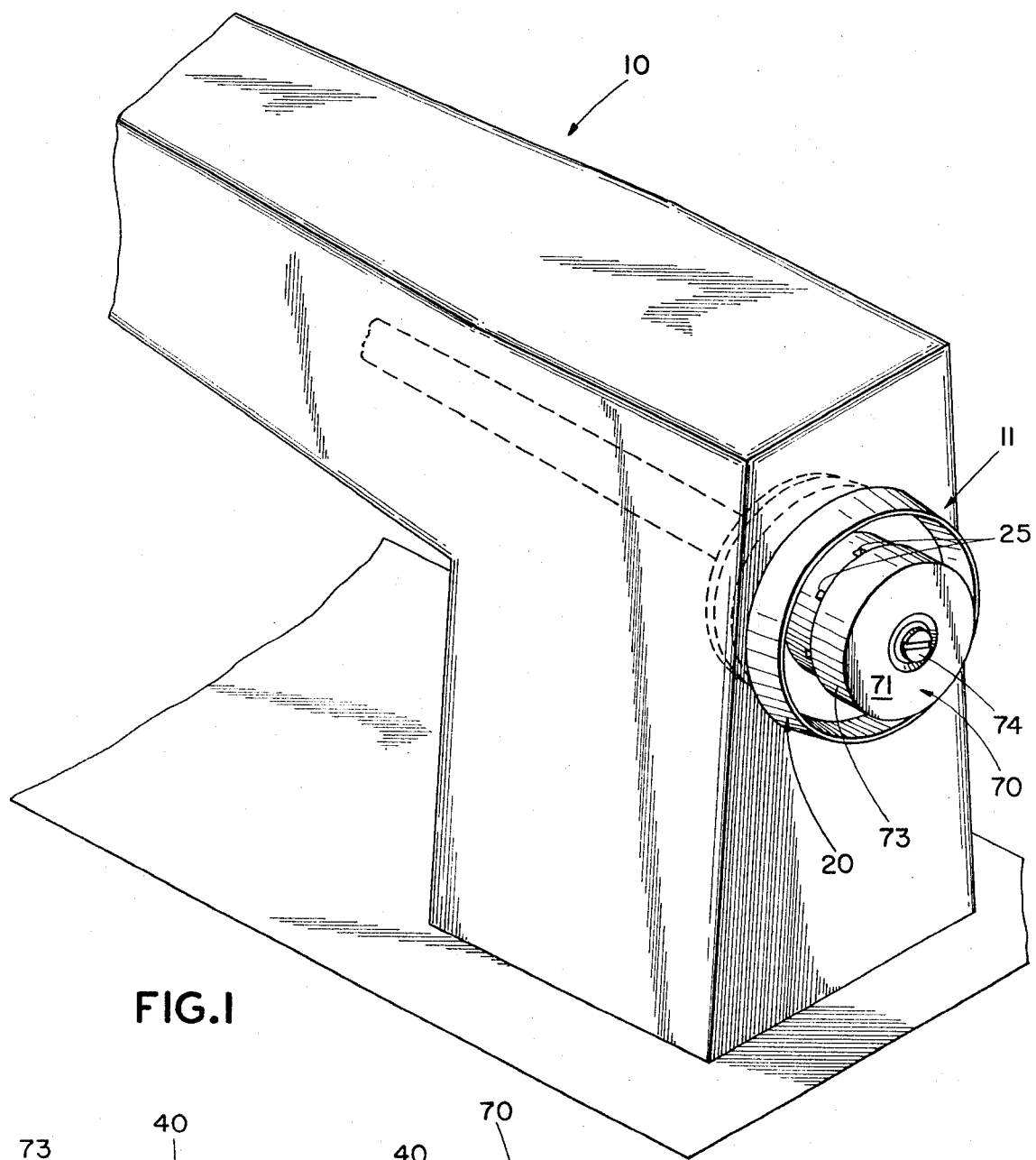
FIG. 1 is a partial perspective view illustrating the position of the clutch of the present invention on a housing of a typical sewing machine, with portions being illustrated in dashed lines showing the general location of the drive shaft and drive member within the machine housing.
Figure 5:
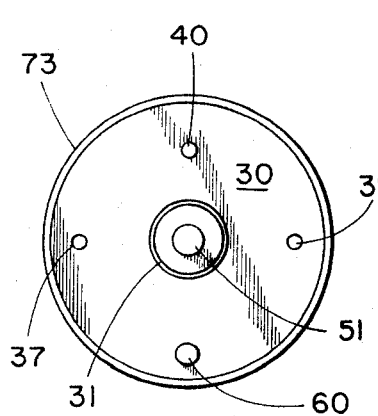
FIG. 5 is a rear elevational view of the clutch mechanism.
Figure 2:
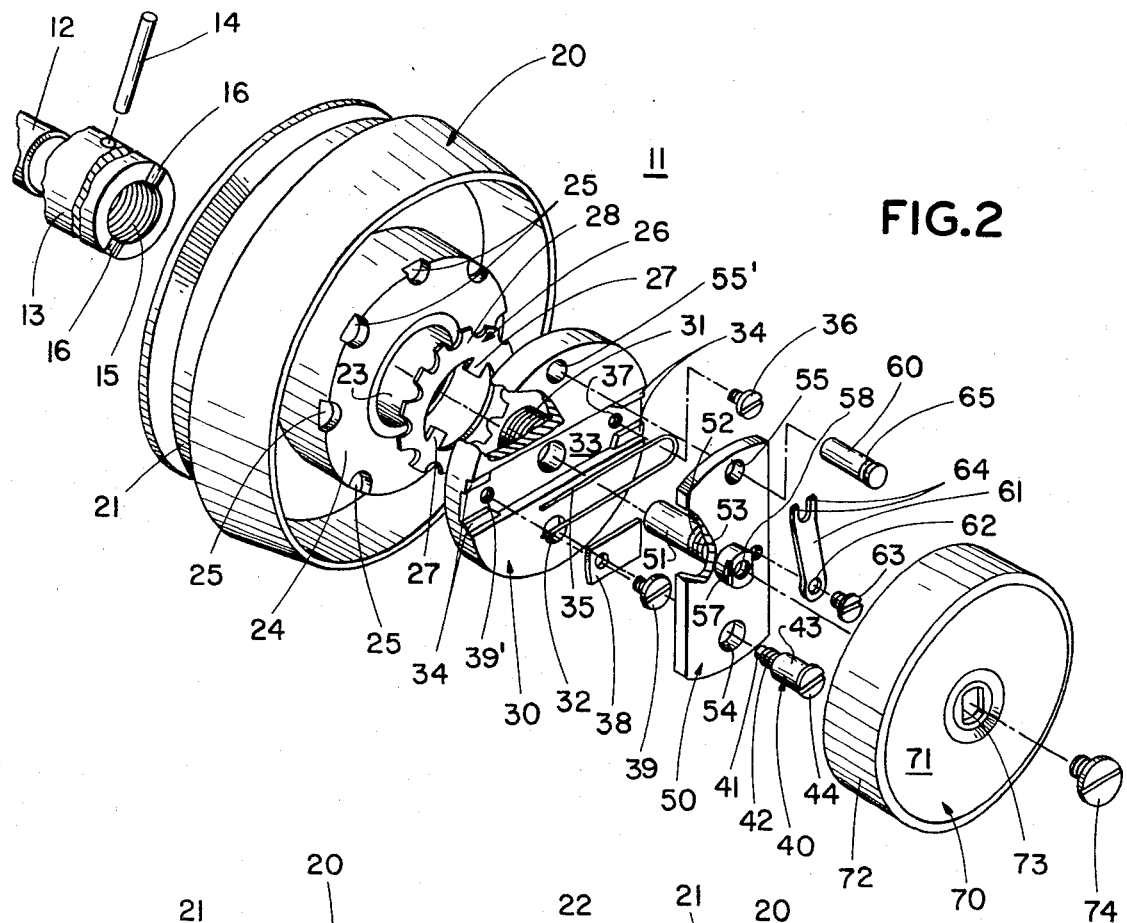
FIG. 2 is an exploded perspective view of the clutch of the present invention, illustrating in detail the arrangement of the various component parts thereof.

Referring now more particularly to FIGS. 1 and 2 of the drawings, there is illustrated a portion of a sewing machine housing 10 carrying thereon the push-pull clutch device of the present invention designated generally by the numeral 11. The sewing machine may be a typical self-contained motor-driven sewing machine produced by any number of manufacturers, the details of the sewing mechanism thereof not forming any part of the present invention.

Figures 3, 4:
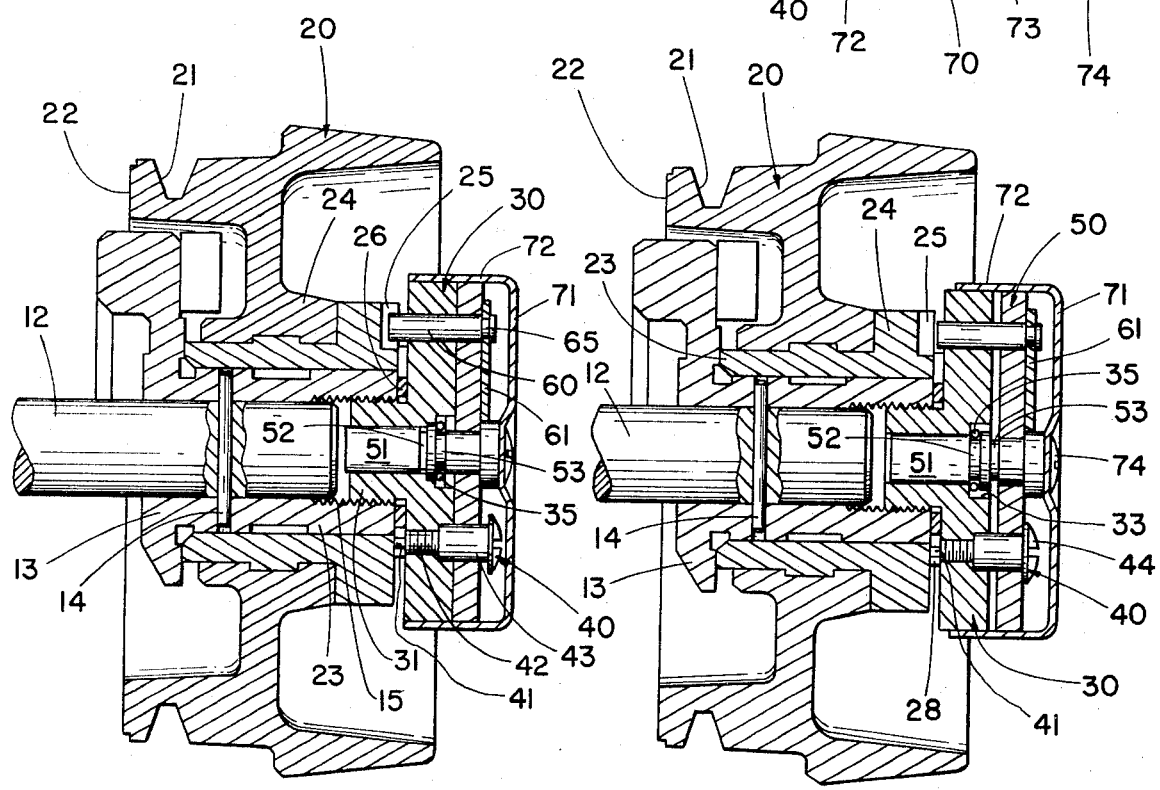
FIG. 3 is a side sectional view of the clutch of the present invention, illustrating the clutch in the engaged position with the drive member operable to effect rotation of the drive shaft.
FIG. 4 is a view similar to FIG. 3, but illustrating the clutch in the disengaged position whereby the drive member is rotatable independently of the drive shaft.

As best illustrated in FIGS. 2 and 3, located within the housing 10 of the sewing machine is a drive shaft 12 which effects operation of the various sewing mechanisms normally found therein. In the illustrated embodiment, the drive shaft 12 is provided with a shaft sleeve 13 which is rigidly connected to the shaft 12 by means of a shaft pin 14. The end of the sleeve 13 is internally threaded at 15 for receiving parts of the clutch 11 as hereinafter described. In addition, the sleeve 13 is provided with a pair of diametrically disposed key notches 16 on the outer end thereof. Although a shaft sleeve 13 is used herein, the internal threads 15 and keying notches 16 may be provided directly on the shaft end.

Surrounding the end of the drive shaft 12 and shaft sleeve 13 is a drive member 20 which, in the present case, may take the form of a pulley provided with a pulley groove 21. In operation, the pulley 20 would be directly connected to an electric motor via a belt drive, one end of the belt residing within the groove 21 and effecting rotation of the pulley wheel 20 when the motor is operated. In the present case, the drive member 20 is provided with a ridged interior face 22 which functions to drive the bobbin winder through other mechanism, not shown, in engagement with the face 22. The pulley 20 is mounted for coaxial rotation on the shaft 12 by means of a suitable bearing 23 in well-known fashion.

Because the pulley is mounted for rotation independently of and about the drive shaft 12, the clutch mechanism of the present invention is provided to effect a positive driving engagement between the pulley 20 and the drive shaft 12 when it is desired to operate the sewing mechanism of the machine. A description of the clutch can best be understood with reference to FIGS. 2 and 3, moving from left to right.

As best seen in FIG. 2, the right-hand side of the pulley 20 is provided with an outwardly extending annular boss 24. The boss 24 is provided with a plurality of circumferentially spaced and axially extending pockets or pits 25 therein.

Figure 7:
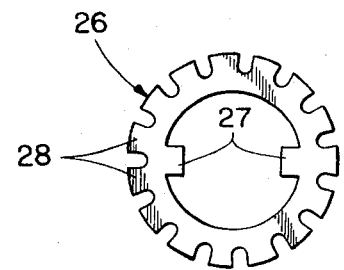
FIG. 7 is a front elevational view of the spline type washer.

A spline-type washer 26 is disposed adjacent the end of the shaft sleeve 13 and extends over part of the boss 24. The washer 26 is provided with a pair of diametrically opposed inner keys 27 (FIG. 7) which are adapted to reside within the keying notches 16 of the shaft sleeve 13. The washer 26 further is provided with outwardly extending splines 28 about the periphery thereof.

A base member 30 is positioned adjacent the washer 26, the base member 30 being provided with a hollow threaded shaft portion 31 (FIGS. 2 and 6) which is rotatably threaded into the inner threaded portion 15 of the shaft sleeve 13.

The base member 30 is provided with a stepped aperture 32 therein to receive a transmission pin 40. the base member 30 further is provided with a diametrically extending channel 33 therein, the channel being provided with pairs of shoulders 34 at the opposite ends thereof. A hairpin-shaped spring 35 is mounted on the shoulders 34 and is held within the channel 33. A first screw 36 engages the bight portion of the spring 35 and passes into a threaded opening 37 at one end of the channel 33. The legs of the spring 35 are held on the opposite shoulders 34 by means of a spring plate 38 which is held in position by a screw 39 passing into an appropriate opening 39' in the channel 33.

An operating member 50 is carried by the base member 30 and is mounted for axial movement relatively thereto. The operating member includes an axially extending cylindrical shaft portion 51 which fits within a cylindrical opening disposed in the center of the channel 33 and extends through the hollowed shaft 31 of the base member 30.

The shaft portion 51 includes first and second cicrumferential grooves 52 and 53, respectively. The grooves 52 and 53 are substantially equivalent in width to the diameter of the legs of the hairpin spring 35, whereby the legs of the spring 35 are adapted to firmly engage the shaft portion 51 within either the first or second of the grooves 52 or 53, thereby to hold the operating member 50 in one of two operating positions relative to the base member 30.

The operating member 50 has an opening 54 therethrough which receives the transmission pin 40. As best seen in FIGS. 2 and 3, the transmission pin 40 is provided with three sections along its shank, including a reduced end portion 41 adapted to be disposed between a pair of splines 28 on the washer 26, a threaded portion 42 which is screwed into the threaded portion of the aperture 32 of the base member 30, and an elongated smooth cylindrical shank portion 43 which bears against the shoulder in the aperture 32 of the base member and also extends through and beyond the base member 30.

The cylindrical shank portion 43 extends a distance which accommodates axial movement of the operating member 50 between its first and second operating positions, as limited in part by the distance between the grooves 52 and 53, as best seen in FIGS. 3 and 4. The head 44 of the transmission pin 40 precludes accidental removal of the operating member 50 from the base member 30.

In order to provide the driving connection between the drive member 20 and the drive shaft 12, the operating member 50 carries thereon an elongated cylindrical drive pin 60, the drive pin 60 extending through aligned apertures 55 in the operating member 50 and 55' in the base member 30.

The aligned apertures 55, 55' are disposed on the operating member 50 and the base member 30 at a distance from the axes thereof such that they will overlie a circle drawn through the center of the pockets 25 in the boss 24 on the drive member 20. As best seen in FIG. 3, when the operating member is pushed into the second operating position, namely, the engaged position, the end of the drive pin 60 extends within one of the pockets 25 disposed in the boss 24.

When the clutch is in the disengaged condition, that is, with the operating member 50 pulled to the first operating position (illustrated in FIG. 4 and by the dashed lines in FIG. 6), the drive pin 60, being carried by the operating member 50, is pulled to the right far enough so that the end thereof will not extend into any of the pockets 25 on the boss 24. In this position, the inner end of the drive pin 60 will be out of complete contact with the boss 24, whereby the drive member or pulley 20 can rotate without driving contact with the operating member 50 and drive shaft 12.

A bias means 61 is provided to insure positive seating of the drive pin 60 in a pocket 25 when the operating member 50 is pushed to the operating, or engaged, position. When the drive member 20 is driven by the motor when winding a bobbin, or upon termination thereof, and the operating member 50 is pushed to the engaged position so as to effect rotation of the drive shaft, the drive pin 60 will not necessarily be in alignment with one of the pockets 25. To insure that the drive pin 60 will properly engage one of the pockets 25 when the operating member 50 is pushed to the engaging position, and to accommodate some axial movement of the drive pin so that the pin does not bind against the face of the boss between a pair of pockets 25, there is provided an appropriate bias means in the form of a bifurcated spring plate 61.

The spring plate 61 is offset as illustrated in FIG. 2 and includes a screw opening 61 through which passes a screw 63 and is threaded into an opening 56 in the operating member 50. The opposite end of the spring plate is provided with generally U-shaped legs 64 which engage the drive pin 60 around an annular groove 65 provided at the outer end of the pin 60. The spring plate allows the drive pin to be pushed back by the boss 24 in the event the pin 60 is not in alignment with a pocket 25. As soon as there is such alignment, the constant force of the spring plate 61 urges the drive pin 60 into a pocket 25.

A manipulating handle or drum 70 is provided to facilitate operation of the clutch 11 by the machine operator. The manipulating handle 60 overlies the operating member 50 and the base member 30 and provides an appropriate shield for the various component parts located therein.

The manipulating handle 70 includes a flat face portion 71 and an annular rim 72 which overlies the base member 30 and the operating member 50. The manipulating handle 70 is mounted upon the operating member 50 by means of a flat-sided shoulder 54 on the end of the shaft portion 51 of the operating member 50, a complementary flat-sided opening 73 being provided in the face portion of the handle 70. A screw 74 passes through the opening 73 and into a threaded opening 58 provided in the shaft 51. If desired, the annular rim 72 of the handle 70 may be long enough to also overlie the boss portion 24 of the pulley 20, so long as it is out of contact therewith.

The clutch 11 is operated in the following manner: When it is desired to operate the various sewing mechanisms in the machine by means of the drive shaft 12, the manipulating handle 70 will be pushed to the left, to assume the position illustrated in FIG. 3 and in full lines in FIG. 6. The handle 70, being affixed to the shaft 51, also effects movement of the shaft 51 and operating member 50 to the left. Under this condition, the hairpin spring 35 resides within the right-hand groove 53 carried by the cylindrical shaft 51 of the operating member 50.

Because the drive pin 60 also is carried by the operating member 50, the manipulating handle 70, together with movement of the operating member 50 to the left, causes leftward movement of the drive pin 60 so that the end thereof engages within one of the pockets 25 on the boss 24. Rotation of the drive member 20 with concomitant rotation of the boss 24 and pockets 25 will cause the drive pin 60, the operating member 50 and the base member 30, to be rotated at the same speed. The transmission pin 40, extending beyond the base member and between a pair of splines 28 on the washer 26 will effect a like rotation of the washer 26. The inner keys 27 on the washer 26, because of their engagement in the key notches 16 of the shaft sleeve 13, will effect concomitant rotation of the shaft sleeve 13 and thereby effect rotation of the shaft 12.

Figure 6:
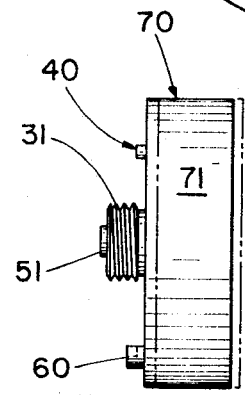
FIG. 6 is a side elevational view of the assembled clutch, illustrating the manipulating handle and drive member in two operating positions thereof.

When it is desired to wind the bobbin by use of the drive member 20, the clutch is pulled to the disengaged position by the operator pulling the manipulating handle 70 to the right to the position illustrated in FIG. 4 (as illustrated in dashed lines in FIG. 6). Under this condition, the drive pin 60 does not engage any pocket 25 nor does it contact any portion of the boss 24, whereby the drive member 20 is rotatable without effecting any movement of the drive shaft 12.

It will be seen from the foregoing that there has been provided a simple push-pull type clutch for use in a sewing machine whereby the operator may easily effect engagement and disengagement of the drive member of the machine from the drive shaft so that the drive member may be used for other purposes.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. A push-pull clutch for use in a sewing machine for selectively effecting rotation of a rotary drive shaft in the sewing machine, said clutch comprising a base member in driving relationship with one end of said drive shaft and rotatable therewith; a drive member coaxially mounted on said drive shaft and freely rotatable relative thereto, said drive member haivng a boss portion carrying a plurality of circumferentially spaced and axially extending pockets therein; a spline type washer disposed between said base member and said boss and having at least one inwardly extending key engageable in a cooperating notch provided in the end of said drive shaft, whereby said washer is rotatable with said drive shaft, said washer having a plurality of outwardly extending circumferentially spaced splines; an operating member carried by said base member and movable between first and second operating positions in an axial direction relative to said boss and said base member; a transmission pin extending through aligned apertures provided in said base member and said operating member and between a pair of splines on said washer, whereby rotation of said operating member effects rotation of said base member and said washer and said drive shaft; and a drive pin carried by said operating member and axially movable therewith relative to said base member and said boss, said drive pin being spaced from said boss when said operating member is pulled to said first operating position, whereby said drive member is rotatable relative to said drive shaft, said drive pin being engaged within one of said pockets in said boss when said operating member is pushed into said second operating position whereby rotation of said drive member effects rotation of said drive shaft.

2. The clutch set forth in claim 1, and further including means for positively holding said operating member in said first or second operating positions so as to preclude accidental engagement or disengagement of said drive member with said drive shaft.

3. The clutch set forth in claim 2, wherein said operating member includes an axially extending shaft portion disposed within an annular recess provided in said base member, said shaft portion including first and second circumferential grooves therein for fixing the extent of axial movement of said operating member and said holding means comprises a hairpin type spring affixed to said base member, the legs of said spring being adapted to engage and reside in said first or second of said grooves thereby to hold said operating in said first or second operating positions.

4. The clutch set forth in claim 1, wherein said drive pin extends through a pair of aligned apertures provided in said base member and said operating member.

5. The clutch set forth in claim 4, and further including a bias member which holds said drive pin in position on said operating member, said bias member insuring engagement of said drive pin within one of said pockets on said boss when said operating member is pushed to its second operating position.

6. The clutch set forth in claim 1, and further including a manipulating handle secured to said operating means, said handle including a shielding surface overlying said operating member and said base member while said operating member is in either said first or second operating positions.

7. A push-pull clutch for use in a sewing machine for selectively effecting rotation of a rotary drive shaft in the sewing machine, said clutch comprising a base member in driving relationship with one end of said drive shaft and rotatable therewith; a drive member co-axially mounted on said drive shaft and freely rotatable relative thereto, said drive member having an annular boss portion carrying a plurality of circumferentially spaced and axially extending pockets therein; a spline type washer disposed between said base member and said boss and having at least one inwardly extending key engageable in a cooperating notch provided in the end of said drive shaft, whereby said washer is rotatable with said drive shaft, said washer having a plurality of outwardly extending circumferentially spaced splines; an operating member carried by said base member and movable between first and second operating positions in an axial direction relative to said boss and said base member, said operating member having an axially extending shaft portion disposed within an annular recess provided in said base member, said shaft portion including first and second circumferential grooves therein for fixing the extent of axial movement of said operating member, holding means for engaging said grooves and comprising a haripin type spring affixed to said base member, the legs of said spring being adapted to engage and reside in said first or second of said grooves thereby to hold said operating member in said first or second operating positions; a transmission pin extending through aligned apertures provided in said base member and said operating member and between a pair of splines on said washer, whereby rotation of said operating member effects rotation of said base member and said washer and said drive shaft; a drive pin carried by said operating member and axially movable therewith relative to said base member and said boss, said drive pin extending through a pair of aligned apertures provided in said base member and said operating member, said drive pin being spaced from said boss when said operating member is pulled to said first operating position, whereby said drive member is rotatable relative to said drive shaft, said drive pin being engaged within one of said pockets in said boss when said operating member is pushed into said second operating position whereby rotation of said drive member effects rotation of said drive shaft; and a bias member which holds said drive pin in position on said operating member, said bias member insuring engagement of said drive pin within one of said pockets on said boss when said operating member is pushed to its second operating position.

8. The clutch set forth in claim 7, wherein said bias member comprises a spring plate fixed to said operating member.

9. The clutch set forth in claim 7, wherein said pockets on said boss and said aligned apertures for said drive pin are disposed beyond the periphery of said splines on said washer.

10. The clutch set forth in claim 7, wherein said transmission pin includes a first portion which engages said washer, a second portion which is secured in said base member, a third portion which extends through and beyond said operating member, and a head which precludes accidental removal of said operating member when said operating member is pulled to its first operating position.

* * * * *

UNITED STATES PATENT OFFICE
CERTIFICATE OF CORRECTION

PATENT NO. : 3,869,030
DATED : March 4, 1975
INVENTOR(S) : Noiyasu Masaki

It is certified that error appears in the above-identified patent and that said Letters Patent are hereby corrected as shown below:

Column 1, line 11, "engatement" should be --engagement--;

Column 3, line 67, "crumferential" should be --rcumferential--;

Column 5, line 4, "61" should be --62--;

line 5, "and" should be --that--;

line 17, "60" should be --70--;

Column 6, line 22, "haiving" should be --having--; and line 63, after "operating" insert --member--.

Signed and sealed this 29th day of April 1975.

(SEAL)
Attest:

RUTH C. MASON
Attesting Officer

C. MARSHALL DANN
Commissioner of Patents
and Trademarks